H. E. ALLEN & F. T. MITCHELL.
VACUUM DRIER.
APPLICATION FILED MAY 25, 1915.
1,165,306.
Patented Dec. 21, 1915.
2 SHEETS—SHEET 1.
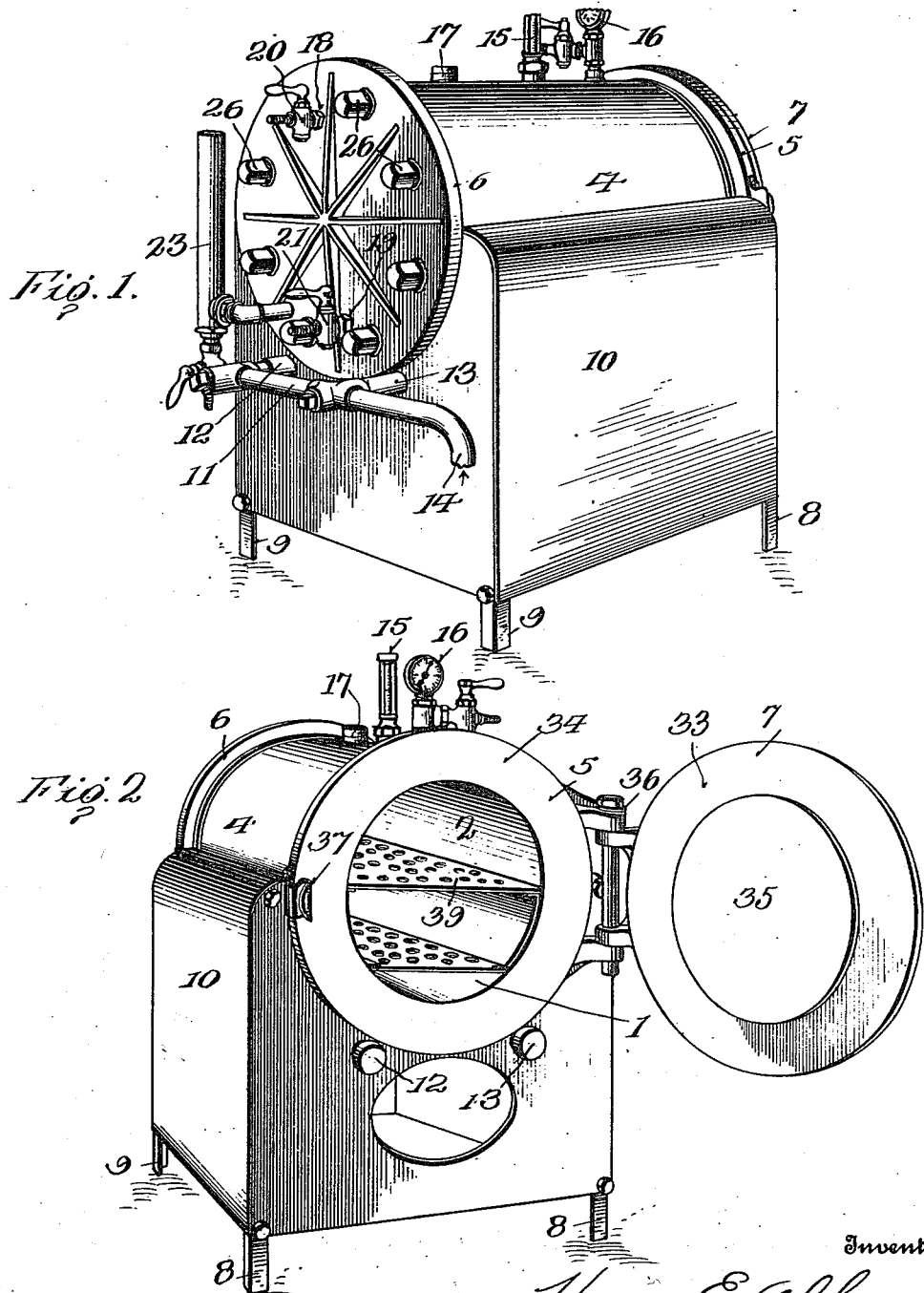

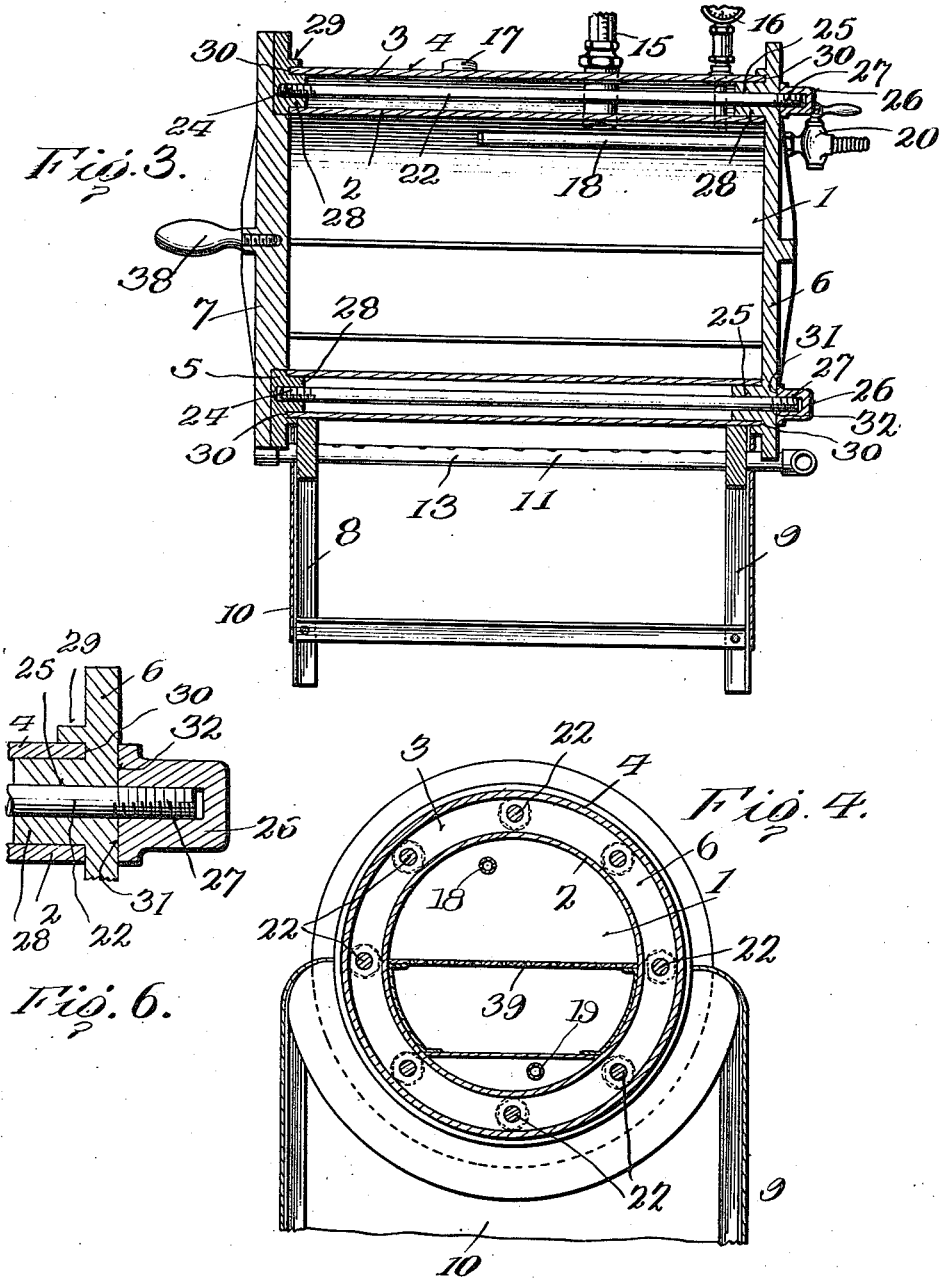

UNITED STATES PATENT OFFICE.

HARRY E. ALLEN AND FRANK T. MITCHELL, OF WASHINGTON, DISTRICT OF COLUMBIA.

VACUUM-DRIER.

1,165,306.   Specification of Letters Patent.   Patented Dec. 21, 1915.

Application filed May 25, 1915. Serial No. 30,366.

*To all whom it may concern:*

Be it known that we, HARRY E. ALLEN and FRANK T. MITCHELL, citizens of the United States, residing at Washington, in the District of Columbia, have invented certain new and useful Improvements in Vacuum-Driers, of which the following is a specification.

This invention relates to certain new and useful improvements in driers, and resides more especially in the production of a vacuum drier in which the drying oven is vacuumized and heated by a liquid circulated about the said oven between the thin walls of the oven and the surrounding heating chamber. In practice certain disadvantages have accompanied the use of such driers, and it has been found that their efficiency has been greatly reduced by leakage into the vacuum oven from the surrounding heating chamber, and in some cases out of the said heating chamber to the atmosphere. The presence of this leakage factor has materially lessened the commercial use of this type of drier, and up to the present time had never been successfully overcome.

An object therefore, of this invention is to produce a vacuum drier, the present design and type of which can be adhered to, and at the same time all leakage prevented.

Another object of this invention is the provision of a drier comprising a vacuum oven and surrounding heating chamber constructed of thin walls, and peculiarly designed end wall sections having means extending longitudinally of the drier and co-acting with the said end walls for seating the ends of the drying oven and heating chamber therein.

With these and other objects in view the invention further consists in the arrangement and combination of parts hereinafter described and claimed.

In the drawings: Figure 1 is a perspective view of the improved vacuum drier looking at the rear end. Fig. 2. is a similar view looking at the front end with the door shown open and the vacuum oven exposed. Fig. 3 is a vertical sectional view through the drier. Fig. 4 is a transverse sectional view through the drier. Fig. 5 is a detail perspective of one of the connecting rods and fastening nut, and Fig. 6 is an enlarged detail sectional view of one end of the rod, end wall and fastening nut.

The vacuum drier herein shown comprises an inner vacuum oven surrounded by a heating chamber in which a liquid is heated to the desired temperature. One end of the oven is provided with a door through which the articles to be treated are inserted. A suitable burner is provided for heating the oven. The usual gages and other associated indicating devices are also provided.

Referring to the drawing, the vacuum drier includes among other things an oven 1 formed by a cylindrical shell 2 of thin material; a surrounding heat chamber 3 formed by a similar shell 4 of corresponding thin material and spaced from the inner shell 2 as shown for the circulation of the heating liquid; and end wall sections 5 and 6 designed to engage the ends of the said cylindrical shell sections and form therewith air and water tight joints. Coöperating with the end wall 5 is the door 7 of the drier. Front and rear supporting legs 8 and 9 are provided upon the drier and a hood 10 is preferably secured thereto as shown. This hood assists in confining the heat from the burner 11 which extends longitudinally beneath the outer shell of the drier. This burner may be of any standard design and comprises two inwardly extending pipe sections 12 and 13 suitably perforated for the igniting of the gas. An inlet 14 is provided for the burner leading from any suitable source of supply.

At the rear end of the drier a constant liquid level device 23 of ordinary construction is provided and automatically regulates the amount of liquid in the heating chamber. This liquid is preferably water and may be heated to any desired temperature. At the top of the drier there is located the usual thermometer 15 and gage 16, and the liquid return outlet 17 to a condenser. These devices may be of any standard type and form no part of the present invention.

Located within the oven are the air exhausting devices 18 and 19 which extend through the end wall 6 and are connected to any suitable vacuumizing device by the valved controlled connections 20 and 21.

The means for securing the end walls in position against the ends of the respective oven and heating chamber shells comprise among other things longitudinally disposed rods 22 preferably arranged between the said shells. One end of these rods is screwed into the end wall section 5 as at 24, and the other end thereof is passed through the end wall 6 as at 25 and receives a nut 26 upon the screw threaded end 27, thereby bringing the said sections in contact with the ends of the said oven and heating shells. These contacting surfaces of the said end walls and respective shells are of novel construction and as shown comprise inwardly extending flanges 28 adapted to be positioned between the thin walls of the oven and heating chamber, for a distance as shown. Coöperating with these said flanges 28 are other flanges 29 extending inwardly from the end wall sections and adapted to guide and further secure the shells and end wall sections in their correlated positions. At the base of the said flanges 28 and 29 are provided annular seats 30 for the contacting of the ends of the shells 2 and 4. These seats are ground so that the joint made by the contacting parts, which may also be ground, will be air and water tight when drawn together. Upon the outer face of the end wall section 6 there is formed an annular ground seat 31 with which the ground surface 32 of the nut 27 contacts. Thus it will be seen that the peculiar arrangement of these contacting surfaces when drawn together by the turning of the nuts upon the rods, will provide an efficient and positive air and water tight connection for the drier. While these rods are shown as extending between the respective shell section we do not so limit ourselves to that exact construction, as they may be otherwise disposed for drawing the said contacting parts together. The door of the drier is also provided with a ground surface 33 to contact with a similar surface 34 upon end wall 5. An inwardly extending portion 35 is provided upon the door and enters the oven a short distance. A hinge 36 is provided for the door and a spring latch 37 may also be provided as shown. The handle 38 is preferably located at the center of the door. A suitable tray 39 is provided within the drying oven for holding the articles to be treated.

From the foregoing it will be obvious that an efficient and highly commercial drier is provided, and one in which the articles to be treated can be positively dried without being subjected to certain extraneous molestation as has heretofore been experienced.

Having described our invention, what we claim and desire to secure by Letters Patent is:

1. A vacuum drier of the class described including in combination a vacuumized drying oven, a chamber surrounding the said oven and adapted to receive a heating medium, end walls for the said chamber and drying oven and means including ground contacting surfaces for the securing of the ends of the drying oven to the said end walls.

2. A vacuum drier of the class described including in combination a vacuumized heating oven of shell-like formation a chamber surrounding the said oven and adapted to receive a heating medium, end walls having seats formed therein adapted to receive the ends of said oven and means including flat ground contacting surfaces formed upon the ends of the said drying oven for fastening the said drying oven upon the seats formed in the end wall.

3. A vacuum drier of the class described including in combination a vacuumized heating oven, a chamber surrounding the said oven, and adapted to receive a heating medium, end walls having continuous flanges formed thereon, seats formed upon the said end walls at the base of the flanges, and adapted to receive the ends of the said drying oven, and means for forcing the said flanges within the said chamber and securing the said drying oven within the seats formed in the end walls.

4. A vacuum drier of the class described including in combination a vacuumized heating oven, a chamber surrounding the said oven, and adapted to receive a heating medium, end walls having seats formed therein and adapted to receive the ends of the drying oven, rods extending from one end wall to the other end wall and located in the chamber surrounding the oven, and means including a nut adapted to be screwed upon one end of said rods for securing the ends of the said drying oven within the seats formed upon the end walls.

5. A vacuum drier of the class described including in combination a vacuumized heating oven of shell-like formation, a chamber surrounding the said oven and adapted to receive a heating medium, end walls having seats formed therein adapted to receive the ends of said oven, rods extending from one end wall to the other end wall and located in the chamber surrounding the oven, and means on said rods for securing the ends of the drying oven within the seats formed upon the end walls.

In testimony whereof we affix our signatures in presence of two witnesses.

HARRY E. ALLEN.
FRANK T. MITCHELL.

Witnesses:
JAMES F. FITZ GIBBON,
LESLIE C. BROWN.